US009645976B2

(12) United States Patent
Rachi

(10) Patent No.: US 9,645,976 B2
(45) Date of Patent: May 9, 2017

(54) INFORMATION DISPLAY APPARATUS, INFORMATION DISPLAY METHOD AND STORAGE MEDIUM STORING INFORMATION DISPLAY PROGRAM

(71) Applicant: CASIO COMPUTER CO., LTD., Tokyo (JP)

(72) Inventor: Takahiko Rachi, Fussa (JP)

(73) Assignee: CASIO COMPUTER CO., LTD., Tokyo (JP)

(*) Notice: Subject to any disclaimer, the term of this patent is extended or adjusted under 35 U.S.C. 154(b) by 473 days.

(21) Appl. No.: 13/723,737

(22) Filed: Dec. 21, 2012

(65) Prior Publication Data

US 2013/0167023 A1 Jun. 27, 2013

(30) Foreign Application Priority Data

Dec. 27, 2011 (JP) .................. 2011-285048

(51) Int. Cl.
*G06F 17/21* (2006.01)
*G06F 17/27* (2006.01)

(52) U.S. Cl.
CPC .......... *G06F 17/21* (2013.01); *G06F 17/2735* (2013.01)

(58) Field of Classification Search
CPC .... G06F 17/24; G06F 17/2735; G06F 17/241; G06F 17/30011; G06F 17/3002; G06F 17/30884; G06F 3/0483; G06F 17/21
(Continued)

(56) References Cited

U.S. PATENT DOCUMENTS 7,627,816 B2* 12/2009 Bhogal et al. ................ 715/259
8,027,989 B1* 9/2011 Bruecken ..................... 707/758
(Continued)

FOREIGN PATENT DOCUMENTS

CN 102033913 A 4/2011
JP 2005-100254 A 4/2005
(Continued)

OTHER PUBLICATIONS

Japanese Office Action (and English translation thereof) dated May 19, 2015, issued in counterpart Japanese Application No. 2011-285048.
(Continued)

*Primary Examiner* — Wilson Tsui
(74) *Attorney, Agent, or Firm* — Holtz, Holtz & Volek PC

(57) ABSTRACT

An information display apparatus, an information display method and a storage medium including an information display program are described. According to one implementation, the information display apparatus includes a display section, a dictionary information storage section, a text display control section, a character string storage section, a character string list display control section, and an explanatory information display control section. The character string storage section stores a specified character string corresponded with position information showing a position of the character string in a text. The character string list display control section displays in a list the stored character string according to position order of the character string in the text. The explanatory information display control section displays explanatory information of an entry word corresponding to the specified character string.

12 Claims, 11 Drawing Sheets

(58) Field of Classification Search
USPC .......................................................... 715/259
See application file for complete search history.

(56) References Cited

U.S. PATENT DOCUMENTS

| | | | |
|---|---|---|---|
| 8,155,950 B1* | 4/2012 | Bickerstaff ..................... 704/10 | |
| 8,706,685 B1* | 4/2014 | Smith ............... G06F 17/30882 | |
| | | | 707/608 |
| 2002/0072972 A1* | 6/2002 | Lamont ........................... 705/14 | |
| 2002/0156617 A1* | 10/2002 | Aretakis ............... G06F 17/276 | |
| | | | 704/7 |
| 2004/0139400 A1* | 7/2004 | Allam ................... G06F 17/212 | |
| | | | 715/201 |
| 2007/0011160 A1* | 1/2007 | Ferland et al. .................... 707/6 | |
| 2008/0154582 A1* | 6/2008 | Bruecken ........................ 704/10 | |
| 2009/0248640 A1* | 10/2009 | Porat ................................. 707/3 | |
| 2010/0235723 A1* | 9/2010 | Nakajima ..................... 715/205 | |
| 2011/0055263 A1* | 3/2011 | Chiu et al. .................... 707/770 | |
| 2011/0078179 A1 | 3/2011 | Unno | |
| 2011/0126123 A1* | 5/2011 | Reter ................... G06Q 10/109 | |
| | | | 715/751 |
| 2011/0131487 A1* | 6/2011 | Nakajima ..................... 715/259 | |
| 2011/0219304 A1* | 9/2011 | Nakano ......................... 715/705 | |
| 2011/0276876 A1* | 11/2011 | Kwan et al. ................... 715/256 | |
| 2012/0013641 A1* | 1/2012 | Kudo ................ G06F 17/30657 | |
| | | | 345/629 |
| 2012/0233539 A1* | 9/2012 | Reed ...................... G06F 3/0488 | |
| | | | 715/234 |
| 2013/0159847 A1* | 6/2013 | Banke et al. .................. 715/259 | |

FOREIGN PATENT DOCUMENTS

| | | |
|---|---|---|
| JP | 2005-141558 A | 6/2005 |
| JP | 2008186117 A | 8/2008 |
| JP | 2010061340 A | 3/2010 |
| JP | 2010211441 A | 9/2010 |
| JP | 2011-197983 A | 10/2011 |
| JP | 4831248 B2 | 12/2011 |

OTHER PUBLICATIONS

Chinese Office Action (and English translation thereof) dated Oct. 10, 2015, issued in counterpart Chinese Application No. 201210581646.4.

* cited by examiner

INFORMATION DISPLAY APPARATUS, INFORMATION DISPLAY METHOD AND STORAGE MEDIUM STORING INFORMATION DISPLAY PROGRAM

FIELD OF THE INVENTION

The present invention relates to an information display apparatus and the like which searches for corresponding explanatory information based on a specified entry word.

DESCRIPTION OF THE RELATED ART

Conventionally, an information display apparatus such as an electronic dictionary includes a jumping function and a history function which are used when a user desires to read explanatory information of other dictionaries, when a user desires to look at a previously searched word again or the like. Here, the jumping function is a function so that if a user selects a word (hereinafter referred to as jumping target word) in a text when a text such as explanatory information is displayed, the explanatory information of the entry word corresponding to the jumping target word is read from a dictionary of the jumping target. A history function is a function so that an entry word where explanatory information is searched is stored, and search history is displayed as a list according to user operation.

In such an information display apparatus, lately, it is possible to read explanatory information of the jumping target word from a simple dictionary or mini dictionary to be displayed on a different window (for example, Japanese Patent No. 4831248). According to such technique, a very simple piece of explanatory information regarding the jumping target word is displayed. Therefore, it is possible to instantly understand the meaning of the jumping target word and to return to the text of the jumping source.

When text of explanatory information of the dictionary or text of contents of a book are read using such information display apparatus, even if the user finds an interesting character string (a word, etc.) in the text, when the user has no time then, when the user desires to continue reading the text, etc., the user tends to put off looking up the meaning of the character string. In such case, according to the information display apparatus as described in Japanese Patent No. 4831248, although it is possible to understand the meaning of the jumping target word and to return to reading the text relatively fast, reading the text is interrupted anyway. As a result, the user puts off looking up the meaning of the character string.

However, in a conventional information display apparatus, the character string which the user desires to look up is not registered in the search history. Therefore, the user needs to either remember the character string or remember the text or the position of the text in which the character string is recorded. Otherwise, the user cannot look up the meaning of the character string later.

SUMMARY OF THE INVENTION

The present invention has been made in consideration of the above situation, and one of the main objects is to provide an information display apparatus, etc. where a user can surely look up later the meaning of a character string in a text which the user desires to check.

In order to achieve any one of the above advantages, according to an aspect of the present invention, there is provided an information display apparatus including:

a display section;
a dictionary information storage section which stores a plurality of sets of an entry word corresponded to explanatory information of the entry word;
a text display control section which displays a text on the display section based on user operation;
a character string storage section which stores a character string specified by the user operation from among the character string in a text displayed on the display section corresponded with position information showing a position of the character string in the text;
a character string list display control section which displays in a list on the display section the character string stored in the character string storage section based on user operation according to position order of the character string in the text; and
an explanatory information display control section which reads from a storage content of the dictionary information storage section explanatory information of an entry word corresponding to the character string specified by user operation among the character string displayed by control of the character string list display control section to display the explanatory information on the display section.

BRIEF DESCRIPTION OF THE DRAWINGS

The present invention and the above-described objects, features and advantages thereof will become more fully understood from the following detailed description with the accompanying drawings and wherein.

DETAILED DESCRIPTION OF THE PREFERRED EMBODIMENT

An embodiment in which an information display apparatus of the present invention is applied to an electronic dictionary is described in detail with reference to the drawings.

[External Configuration]

Figure 1A:
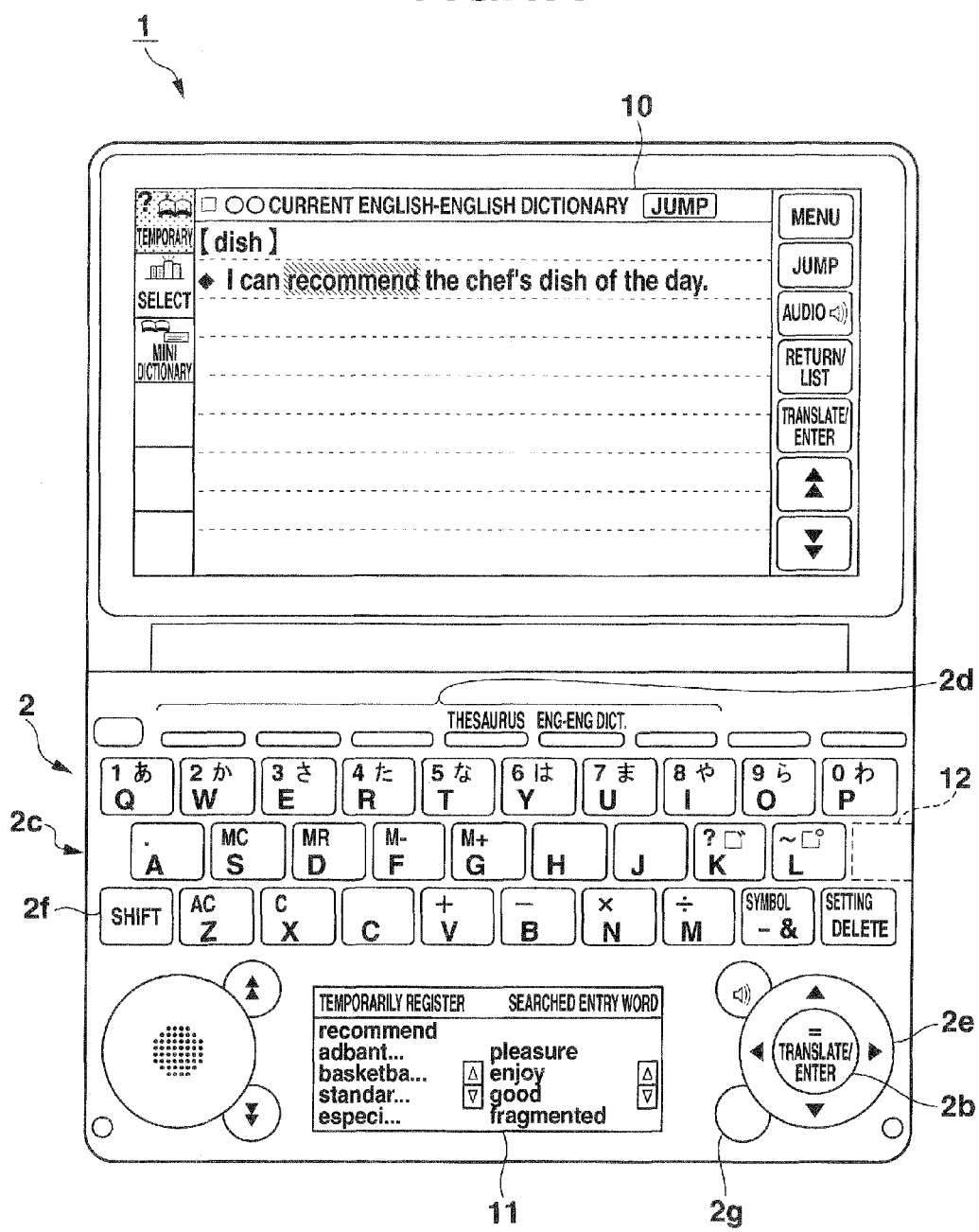
FIG. 1A is a planar view schematically showing an electronic dictionary.

FIG. 1A is a planar view of an electronic dictionary 1.

As described in the drawings, the electronic dictionary 1 includes, a main display 10, a sub display 11, a card slot 12 and key group 2.

The main display 10 and the sub display 11 are portions for displaying various pieces of data such as characters, symbols, etc. according to operation of the key group 2 by the user and are configured with a LCD (Liquid Crystal Display), EL (Electronic Luminescence) display, etc. The main display 10 and the sub display 11 of the present embodiment are formed as one with a touch panel 110 (see FIG. 2) and can receive operation such as input by writing, etc.

The card slot 12 is provided so that an external information storage medium 12a (see FIG. 2) storing various pieces of information can be detachably connected.

The key group 2 includes various keys which receive operation from the user to operate the electronic dictionary 1. Specifically, the key group 2 includes translate/enter key 2b, character keys 2c, dictionary selection keys 2d, cursor keys 2e, shift key 2f, return key 2g, and the like.

The translate/enter key 2b is a key used for executing a search, determining an entry word, etc. The character keys 2c are keys used for input, etc. of characters by the user and the present embodiment includes keys from "A" to "Z". The dictionary selection keys 2d are keys used for selecting a later described dictionary database 820A, etc. (see FIG. 2).

The cursor keys 2e are keys used for movement, etc. of a highlighted display position in the screen, in other words, a cursor position. According to the present embodiment, directions of up, down, left, and right can be specified. The shift key 2f is a key used, for example, when setting a Japanese word as a search target. The return key 2g is a key used, for example, when returning to a screen previously displayed.

[Internal Configuration]

Figure 2:
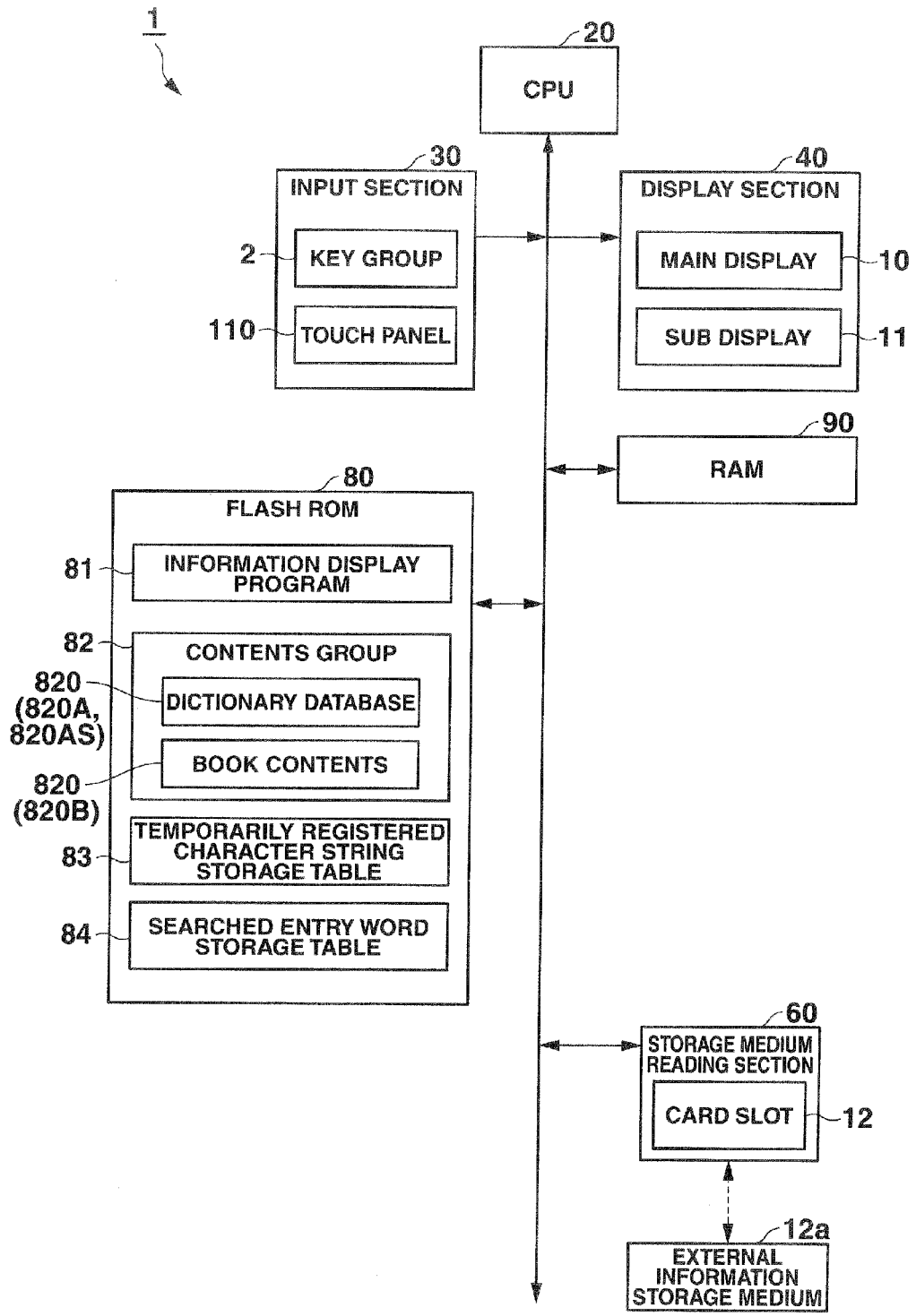
FIG. 2 is a block diagram showing an inner configuration of the electronic dictionary.

Next, an internal configuration of the electronic dictionary 1 is described. FIG. 2 is a block diagram showing an internal configuration of the electronic dictionary 1.

As shown in the diagram, the electronic dictionary 1 includes a display section 40, an input section 30, a recording medium reading section 60, a CPU (Central Processing Unit) 20, a flash ROM (Read Only Memory) 80, and a RAM (Random Access Memory) 90, and each section is connected through a bus so as to be able to perform data communication with each other.

The display section 40 includes the above described main display 10 and sub display 11 and various pieces of information are displayed on the main display 10 and the sub display 11 based on the display signal input from the CPU 20.

The input section 30 includes the above described key group 2 and the touch panel 110, and the signal corresponding to the pressed key or the position of the touch panel 110 is output to the CPU 20.

The recording medium reading section 60 includes the above described card slot 12 and reads out information from an external information storage medium 12a attached to the card slot 12 and records information in the external information storage medium 12.

Here, contents 820, etc. are stored in the external information storage medium 12a. The contents 820 include a data configuration similar to the contents 820 in the later described flash ROM 80, and thus the description is omitted here.

The CPU 20 executes processing based on a predetermined program according to an input instruction to instruct each functional section, to transfer data, etc., and centrally controls the electronic dictionary 1. Specifically, the CPU 20 reads out various programs stored in the flash ROM 80 according to operation signal, etc. input from the input section 30 and executes processing according to the program. The CPU 20 stores the processing result in the RAM 90 and suitably outputs the processing result to the display section 40.

The flash ROM 80 is a memory which stores programs and data to enable various functions of the electronic dictionary 1. According to the present embodiment, the flash ROM 80 stores an information display program 81, contents group 82, temporarily registered character string storage table 83, searched entry word storage table 84, etc. of the present invention.

The information display program 81 is a program which allows the CPU 20 to execute a later described information display processing (see FIG. 3 to FIG. 5).

The contents group 82 includes a plurality of contents 820 and according to the present embodiment, includes a plurality of dictionary databases 820A and book contents 820B.

The dictionary database 820A, etc. stores a plurality of sets of an entry word, text of explanatory information of the entry word, and text of example for each meaning of the entry word corresponded to each other. As the dictionary database 820A, the present embodiment uses the dictionary database 820A such as "Unabridged Japanese Dictionary", "Japanese Dictionary", "Kanji-Character Dictionary", "Personal Computer Terminological Dictionary", "Unabridged English-Japanese Dictionary", "English-Japanese Dictionary", "English-English Dictionary", "English Thesaurus", and the like. In addition, a dictionary database 820A of a mini-dictionary as described in the above described Japanese Patent No. 4831248 is used.

The book contents 820B stores text such as a book, etc. According to the present embodiment, book contents 820B such as "World Literature Collection" is used as the book contents 820B.

A character string (hereinafter referred to as temporarily registered character string) which the user desires to look up in the later described information display processing (see FIG. 3 to FIG. 5) is stored in the temporarily registered character string storage table 83. When the temporarily registered character string is specified in the text, the position information of the temporarily registered character string in the text (position information such as text, line, etc.) and contents name (dictionary title of the dictionary database 820A, book title of the book contents 820B) including the text are stored corresponded to the temporarily registered character string in the temporarily registered storage table 83.

The entry word (searched entry word) which the user searched in the dictionary in the later described information display processing (see FIG. 3 to FIG. 5) is stored in the searched entry word storage table 84. Among the explanation information text of the searched entry word, the position information of the text portion displayed last (hereinafter referred to as "position information of text portion of searched target") and dictionary title of the dictionary database 820 (hereinafter referred to as "dictionary name of dictionary database 820A of searched target") including the explanatory information text portion are stored corresponded to each searched entry word in the searched entry word storage table 84. Further, after the temporarily registered character string is specified in the text, when the temporarily registered character string is searched in the dictionary, the position information of the temporarily registered character string in the text (hereinafter referred to as "position information of the relevant temporarily registered character string") and the contents name of the contents 820 including the text (hereinafter referred to as "contents name of the relevant temporarily registered character string") are stored corresponded to the temporarily stored character string in the searched entry word storage table 84.

The RAM 90 includes a memory region to temporarily store various programs executed by the CPU 20 and data regarding the execution of the programs.

[Operation]

Next, the operation of the electronic dictionary 1 is described with reference to the drawings.

Figure 3:
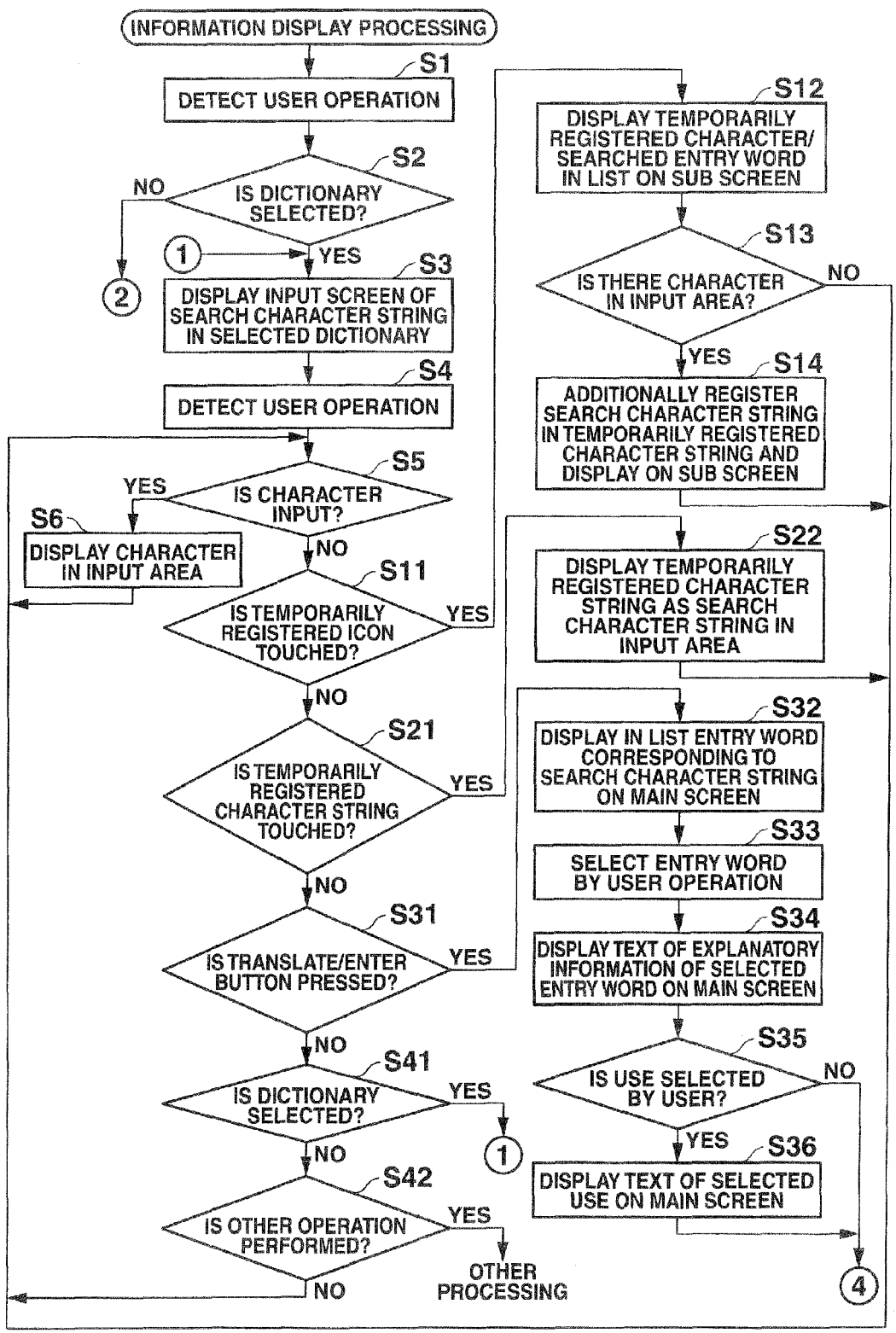
FIG. 3 is a flowchart showing information display processing.
Figure 4:
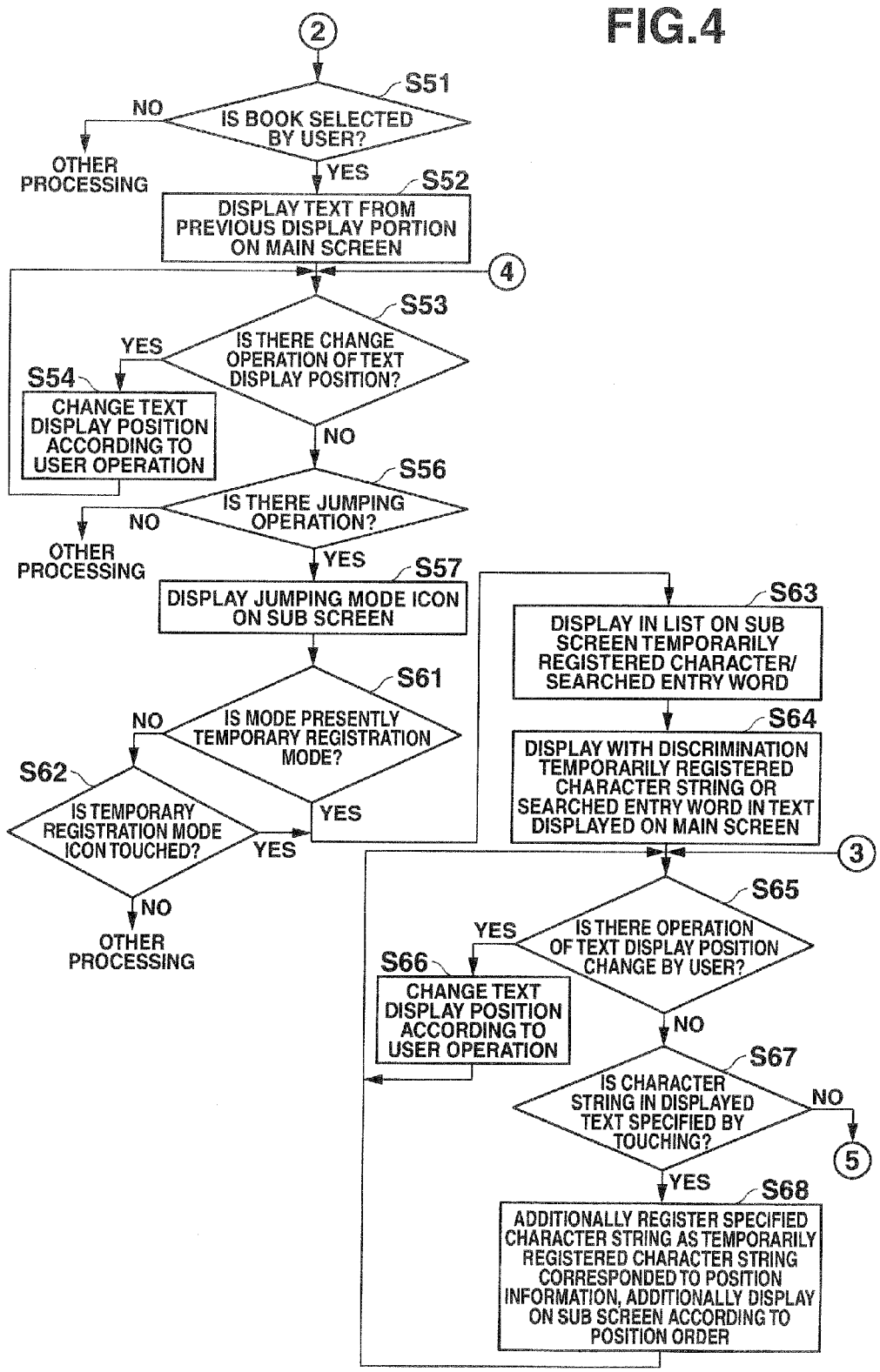
FIG. 4 is a flowchart showing information display processing.
Figure 5:
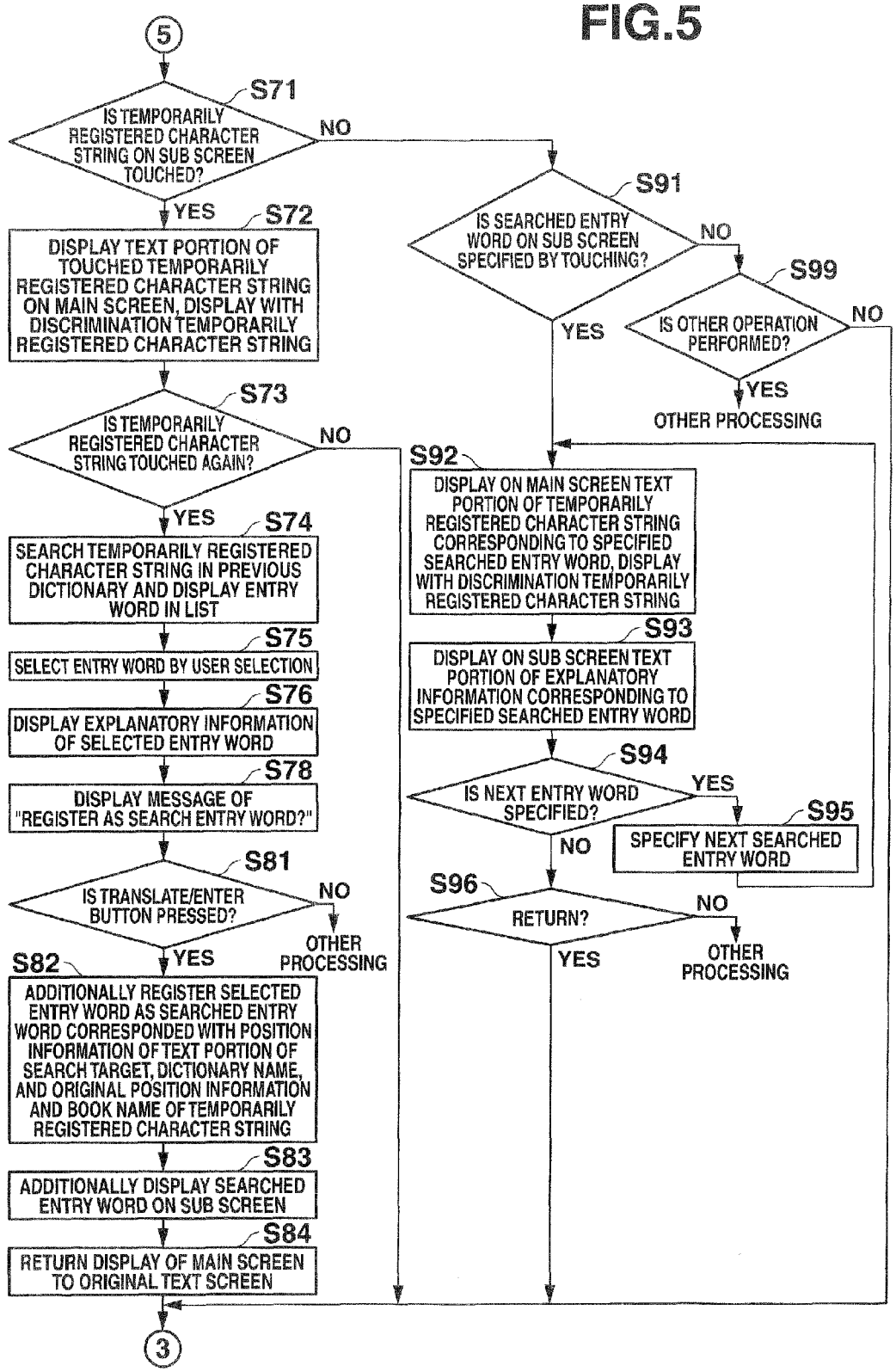
FIG. 5 is a flowchart showing information display processing.

FIG. 3 to FIG. 5 is a flowchart showing a flow of the information display processing in which the CPU 20 reads the information display program 81 to execute the processing.

As shown in the figures, in the information display processing, the CPU 20 first detects user operation on the input section 30 (step S1), and judges whether the detected user operation is a selection operation of the dictionary database 820A (step S2).

In step S2, when it is judged that the user operation is the selection operation of the dictionary database 820A (step S2; Yes), after the input screen of a search character string of the dictionary database 820A which is selected (hereinafter referred to as selected dictionary database 820AS) is displayed on the main display 10 (step S3), the CPU 20 detects the user operation on the input section 30 (step S4). The input screen of the search character string displayed in step S3 includes an input area 100 (see "D" portion of FIG. 6) to input the search character string. In step S3, the CPU 20 displays the temporarily registered icon 101 at the edge portion of the main display 10. The temporarily registered icon 101 is operated to store the temporarily registered character string in the temporarily stored character string storage table 83.

Next, the CPU 20 judges whether the user operation detected in step S4 is an input operation of the search character string (step S5).

In step S5, when the user operation is judged to be input operation of a search character string (step S5; Yes), after the CPU 20 displays the input search character string in the input area 100 (step S6), the processing advances to step S5. According to the present embodiment, in the processing of step S6, the CPU 20 searches the entry word with a prefix match to the input search character string in the selected dictionary database 820AS, and displays in a list the retrieved entry words and also shows a preview display of the explanatory information of the first entry word.

Alternatively, when it is judged that the user operation is not the input operation of the search character string in step S5 (step S5; No), the CPU 20 judges whether the user operation is a touching operation on the temporarily registered icon 101 (step S11).

In step S11, when it is judged that the user operation is the touching operation on the temporarily registered icon 101 (step S11; Yes), the CPU 20 displays in a list on the sub display 11 the temporarily registered character string stored in the temporarily registered character string storage table 83 and the searched entry word stored in the searched entry word storage table 84 (step S12). Specifically, the CPU 20 refers to the position information (position information of the temporarily registered character string in the text) corresponded to each temporarily registered character string in the temporarily registered character string storage table 83 and displays each temporarily registered character string according to the position order. Here, the CPU 20 refers to the "position information of the relevant temporarily registered character string" corresponded to each searched entry word in the searched entry word storage table 84 and displays the searched entry word according to the position order.

Next, the CPU 20 judges whether the search character string is input in the input area 100 (step S13) and when the search character string is not input (step S13; No), the processing advances to step S5.

In step S13, when it is judged that a search character string is input in the input area 100 (step S13; Yes), the CPU 20 additionally stores the search character string in the temporarily registered character string storage table 83, and also additionally displays the search character string in the list of the temporarily registered character strings displayed on the sub display 11 (step S14). Then, the processing advances to step S5.

In step S11, when it is judged that the user operation is not the touching operation on the temporarily registered icon 101 (step S11; No), the CPU 20 judges whether the user operation is a touching operation of any of the temporarily registered character strings on the sub display 11 (step S21).

In step S21, when it is judged that the user operation is a touching operation on any of the temporarily registered character strings on the sub display 11 (step S21; Yes), the CPU 20 inputs the touched temporarily registered character string in the input area 100 of the main display 10 to be displayed (step S22), and advances the processing to step S5. According to the present embodiment, in the processing of step S22, the CPU 20 searches the entry word with a prefix match to the input search character string in the selected dictionary database 820AS, and displays in a list the retrieved entry words and also shows a preview display of the explanatory information of the first entry word.

In step S21, when it is judged that the user operation is not a touching operation on any of the temporarily registered character strings on the sub display 11 (step S21; No), the CPU 20 judges whether the user operation is operation on the translate/enter key 2b (step S31).

In step S31, when it is judged that the user operation is the operation on the translate/enter key 2b (step S31; Yes), the CPU 20 searches the entry word corresponding to the search character string input in the input area 100 in the selected dictionary database 820AS and displays the detected entry word in a list on the main display 10 (step S32).

Next, the CPU 20 selects any of the entry words displayed on the main display 10 based on the user operation (step S33), and reads from the selected dictionary database 820AS the explanatory information text of the entry word which is selected (hereinafter referred to as the selected entry word) to be displayed on the main display 10 (step S34). Between the step S34 and a later described step S35, the CPU 20 can perform a processing similar to later described steps S78 to S83 (see FIG. 5).

Next, the CPU 20 judges whether the selection operation on any of the examples of the selected entry word is performed (step S35), and when it is judged that the selection operation is not performed (step S35; No), the processing advances to a later described step S53 as shown in FIG. 4.

As shown in FIG. 3, in step S35, when it is judged that the selection operation is performed on any of the examples of the selected entry word (step S35; Yes), after the CPU 20 displays the text of the selected example on the main display 10 (step S36), as shown in FIG. 4, the processing advances to the later described step S53.

In step S31, when it is judged that the user operation is not operation on the translate/enter key 2b (step S31; No), the CPU 20 judges whether the user operation is selection operation of the dictionary database 820A (step S41).

In step S41, when it is judged that the user operation is selection operation of the dictionary database 820A (step S41; Yes), the CPU 20 advances the processing to step S3.

In step S41, when it is judged that the user operation is not selection operation of the dictionary database 820A (step S41; No), the CPU 20 judges whether there is other operation (step S42), and when there is other operation (step S42; Yes), the processing advances to other processing and when there is no other operation (step S42; No), the processing advances to step S5.

In the above described step S2, when it is judged that the user operation is not the selection operation of the dictionary database 820A (step S2; No), as shown in FIG. 4, the CPU 20 judges whether the user operation is selection operation of the book contents 820B (step S51) and when it is judged that the user operation is not selection operation of the book contents 820B (step S51; No), the processing advances to other processing.

In step S51, when it is judged that the user operation is selection operation of the book contents 820B (step S51; Yes), the CPU 20 displays on the main display 10 the text of the selected book contents 820B from the position last displayed in the previous information display processing (step S52).

Next, the CPU 20 judges whether the change operation of the display position of the text is performed (step S53) and when it is judged that the operation is performed (step S53; Yes), after the display position of the text is changed according to user operation and the display content of the main display 10 is updated (step S54), the processing advances to step S53.

In step S53, when it is judged that the change operation of the display position of the text is not performed (step S53; No), the CPU 20 judges whether the operation to execute jumping search is performed (step S56) and when it is judged that the operation is not performed (step S56; No), the processing advances to other processing.

In step S56, when it is judged that the operation to execute jumping search is performed (step S56; Yes), as the icon to select the mode of the jumping search, the CPU 20 displays on the sub display 11 a temporary registration mode selection icon 102, a dictionary search mode selection icon 104, and a mini dictionary search mode selection icon 105 (see portion "B" shown in FIG. 6), and then selects any one of the icons to be highlighted and displayed (step S57). Here, the temporary registration mode selection icon 102 is an icon to select the temporary registration mode. In the temporary registration mode, it is possible to additionally register the temporarily registered character string and to perform search using the registered temporarily registered character string. The dictionary search mode selection icon 104 is an icon to select the dictionary search mode. In the dictionary search mode, it is possible to search conventionally known dictionaries and to select the dictionary database 820A. The mini dictionary search mode selection icon 105 is the icon to select the mini dictionary search mode. In the mini dictionary search mode, for example, as described in the above Japanese Patent No. 4831248, dictionary search can be performed using the dictionary database 820A of the mini dictionary.

Next, the CPU 20 judges whether the presently selected icon is the temporary registration mode selection icon, in other words if the present mode of the jumping search is the temporary registration mode (step S61). When it is judged that the mode is the temporary registration mode (step S61; Yes), the processing advances to a later described step S63.

Alternatively, in step S61, when it is judged that the present mode of the jumping search is not the temporary registration mode (step S61; No), the CPU 20 judges whether the touching operation is performed on the temporary registration mode selection icon 102 (step S62) and when it is judged that the operation is not performed (step S62; No), the processing advances to another processing.

Alternatively, in step S62, when it is judged that the touching operation is performed on the temporary registration mode selection icon 102 (step S62; Yes), after the mode of the jumping search is changed to the temporary registration mode and the temporary registration mode selection icon 102 is highlighted and displayed, the CPU 20 displays as a list on the sub display 11 the temporarily registered character string stored in the temporarily registered character string storage table 83 and the searched entry word stored in the searched entry word storage table 84 (step S63). Specifically, here the CPU 20 refers to the position information (position information of the temporarily registered character string in the text) corresponded to each temporarily registered character string in the temporarily registered character string storage table 83 and displays each temporarily registered character string according to the position order. Similarly, here the CPU 20 refers to the "position information of the relevant temporarily registered character string" corresponded to each searched entry word in the searched entry word storage table 84 and displays each searched entry word according to the position order.

Next, the CPU 20 refers to the temporarily registered character string storage table 83 and searched entry word storage table 84 and distinguishes and displays the temporarily registered character string and the searched entry word included in the displayed text of the main display 10 (step S64).

Next, it is judged whether the change operation of the display position of the text is performed (step S65), and when it is judged to be performed (step S65; Yes), the CPU 20 changes the display position of the text according to user operation to update the display contents of the main display 10 (step S66) and then advances the processing to step S65.

Alternatively, in step S65, when it is judged that the change operation of the display position of the text is not performed (step S65; No), the CPU 20 judges whether the specifying operation is performed by touching operation on the character string in the text (step S67).

In step S67, when it is judged that the specifying operation by touching operation on the character string in the text is performed (step S67; Yes), the CPU 20 additionally stores the specified character string in the temporarily registered character string storage table 83 as the temporarily registered character string, stores the position information (position information such as page, line, etc.) in the text of the character string and the contents name including the text corresponded to the temporarily registered character string in the temporarily registered character string storage table 83 (step S68) and advances the processing to step S65. Here, the CPU 20 additionally displays the newly stored temporarily registered character string in the list of the temporarily registered character string on the sub display 11 according to the position order of the temporarily registered character string in the text.

Alternatively, in step S67, when it is judged that the specifying operation by touching operation on the character string in the text is not performed (step S67; No), as shown in FIG. 5, the CPU 20 judges whether the touching operation is performed on any of the temporarily registered character strings on the sub display 11 (step S71).

In step S71, when it is judged that the touching operation on any of the temporarily registered character strings on the sub display 11 is performed (step S71; Yes), the CPU 20 refers to the contents name and the position information corresponded to the touched temporarily registered character string in the temporarily registered character string storage table 83 and among the text of the contents 820, displays on the main display 10 the text portion including the temporarily registered character string of the position shown by the position information and discriminates and displays the temporarily registered character string (step S72).

Next, it is judged whether the touching operation on the temporarily registered character string or the operation of the translate/enter key 2b is performed (step S73), and when it is judged not to be performed (step S73; No), as shown in FIG. 4, the CPU 20 advances the processing to step S65.

As shown in FIG. 5, in step S73, when it is judged that the touching operation on the temporarily registered character string or the translate/enter key 2b is performed (step S73; Yes), the CPU 20 sets the dictionary database 820A used last in the previous information display processing to the selected dictionary database 820AS, searches the entry word corresponding to the temporarily registered character string in the selected dictionary database 820AS and displays the detected entry words in a list on the main display 10 (step S74). The CPU 20 in step S74 can set the dictionary database 820A specified by the user operation as the selected dictionary database 820AS.

Next, the CPU 20 selects any of the entry words displayed on the main display 10 based on the user operation (step S75), reads from the selected dictionary database 820AS the explanatory information text of the entry word which is selected, in other words the selected entry word to be displayed on the main display 10 (step S76).

Next, the CPU 20 displays on the main display 10 a message asking whether to register the selected entry word as the searched entry word in the searched entry word storage table 84 (step S78). Here, the CPU 20 changes the display position of the text according to user operation to update the display content of the main display 10.

Next, it is judged whether the translate/enter key 2b is operated (step S81) and when it is judged not to be operated (step S81; No), the CPU 20 advances to another processing.

In step S81, when it is judged that the translate/enter key 2b is operated (step S81; Yes), the CPU 20 stores the selected entry word as the searched entry word in the searched entry word storage table 84. The CPU 20 further stores the following in the searched entry word storage table 84 corresponded with the searched entry word, the text portion in the explanatory information text where the searched entry word is displayed presently, in other words "position information of the text portion of the searched target", the dictionary name of the dictionary database 820A (selected dictionary database 820AS) including the text portion of the searched target, in other words "dictionary name of the dictionary database 820A of the searched target", and the position information and contents name corresponded to the temporarily registered character string in the temporarily registered character string storage table 83 performed in the touching operation in step S71, in other words, the "position information of the relevant temporarily registered character string" and the "contents name of the relevant temporarily registered character string" (step S82). Here, it is preferable that the CPU 20 deletes the temporarily registered character string touched in step S71 from the temporarily registered character string storage table 83.

Next, the CPU 20 refers to the "position information of the relevant temporarily registered character string" corresponded to each searched entry word in the searched entry word storage table 84 and additionally displays the newly stored searched entry word in the list of searched entry words on the sub display 11 according to the position order of the temporarily registered character string in the text (step S83). After the CPU 20 returns the display content of the main display 10 to the display content at the time of processing step S71 (step S84), as shown in FIG. 4, the processing advances to step S65.

As shown in FIG. 5, in step S71, when it is judged that the touching operation on any of the temporarily registered character string on the sub display 11 is not performed (step S71; No), the CPU 20 judges whether any of the searched entry words on the sub display 11 is specified by the touching operation (step S91).

In step S91, when it is judged that one of the searched entry words on the sub display 11 is specified by touching operation (step S91; Yes), the CPU 20 refers to the "position information of the relevant temporarily registered character string" and the "contents name of the relevant temporarily registered character string" corresponded to the specified searched entry word in the searched entry word storage table 84, and among the text of the contents 820, the CPU 20 displays on the main display 10 the text portion including the temporarily registered character string in the position shown by the position information and discriminates and displays the temporarily registered character string (step S92).

Next, the CPU 20 refers to the "position information of the text portion of the searched target" and the "dictionary name of the dictionary database 820A of the searched target" corresponded to the touched searched entry word in the searched entry word storage table 84 and displays on the sub display 11 the relevant text portion, in other words the text portion displayed last among the explanatory information text of the searched entry word (step S93).

Next, it is judged whether the operation to specify the next searched entry word on the sub display 11 is performed (step S94), and when it is judged to be performed (step S94; Yes), the CPU 20 specifies the searched entry word stored in the searched entry word storage table 84 directly after the searched entry word presently specified (step S95), and advances the processing to step S92.

In step S94, when it is judged that the operation to specify the next searched entry word on the sub display 11 is not performed (step S94; No), the CPU 20 judges whether the return key 2g is operated (step S96).

In step S96, when it is judged that the return key 2g is not operated (step S96; No), the CPU 20 advances to another processing. Alternatively, when it is judged that the return key 2g is operated (step S96; Yes), as shown in FIG. 4, the CPU 20 advances the processing to step S65.

Then, as shown in FIG. 5, in the above described step S91, when it is judged that the searched entry word on the sub display 11 is not specified by touching operation (step S91; No), it is judged whether other processing is performed (step S99) and when other processing is performed (step S99; Yes), the CPU 20 advances to other processing and when it is judged that other processing is not performed (step S99; No), as shown in FIG. 4, the processing advances to step S65.

[Example of Operation]

Next, the above operation is specifically described with reference to the drawings. FIG. 6 to FIG. 10 referred in the description below illustrates the display 3 arranged from the top to the bottom as the display content changes and the left side of the drawings illustrate the order of operation.

(Example of Operation (1))

First, when the user performs the operation of selecting the dictionary database 820A of the "English-English dictionary" (step S1, step S2; Yes), the input screen of the search character string of the selected dictionary database 820AS (English-English Dictionary) is displayed on the main display 10 (step S3).

Next, the user inputs the search character string "dish" (step S4, step S5; Yes) and when the user operates the translate/enter key 2b (step S31; Yes), the entry word "dish", etc. corresponding to the input search character string "dish" is searched in the selected dictionary database 820AS and displayed in a list on the main display 10 (step S32).

Next, when the user selects the entry word "dish" displayed on the main display 10 (step S33), the explanatory information text of the selected entry word "dish" is read from the selected dictionary database 820AS to be displayed on the main display 10 (step S34).

Next, when the user performs the selection operation on the example regarding the selected entry word "dish" (step S35; Yes), as shown in the "A" portion of FIG. 6, the text "I can recommend the chef's dish . . . " of the selected example is displayed on the main display 10 (step S36).

Next, when the user performs the operation to execute the jumping search (step S56; Yes), as shown in the "B" portion of FIG. 6, as the icon to select the jumping search mode, the temporary registration mode selection icon 102, the dictionary search mode selection icon 104 and the mini dictionary search mode selection icon 105 are displayed on the sub display 11 and the temporary registration mode selection icon 102 is selected to be highlighted and displayed (step S57).

Figure 6:
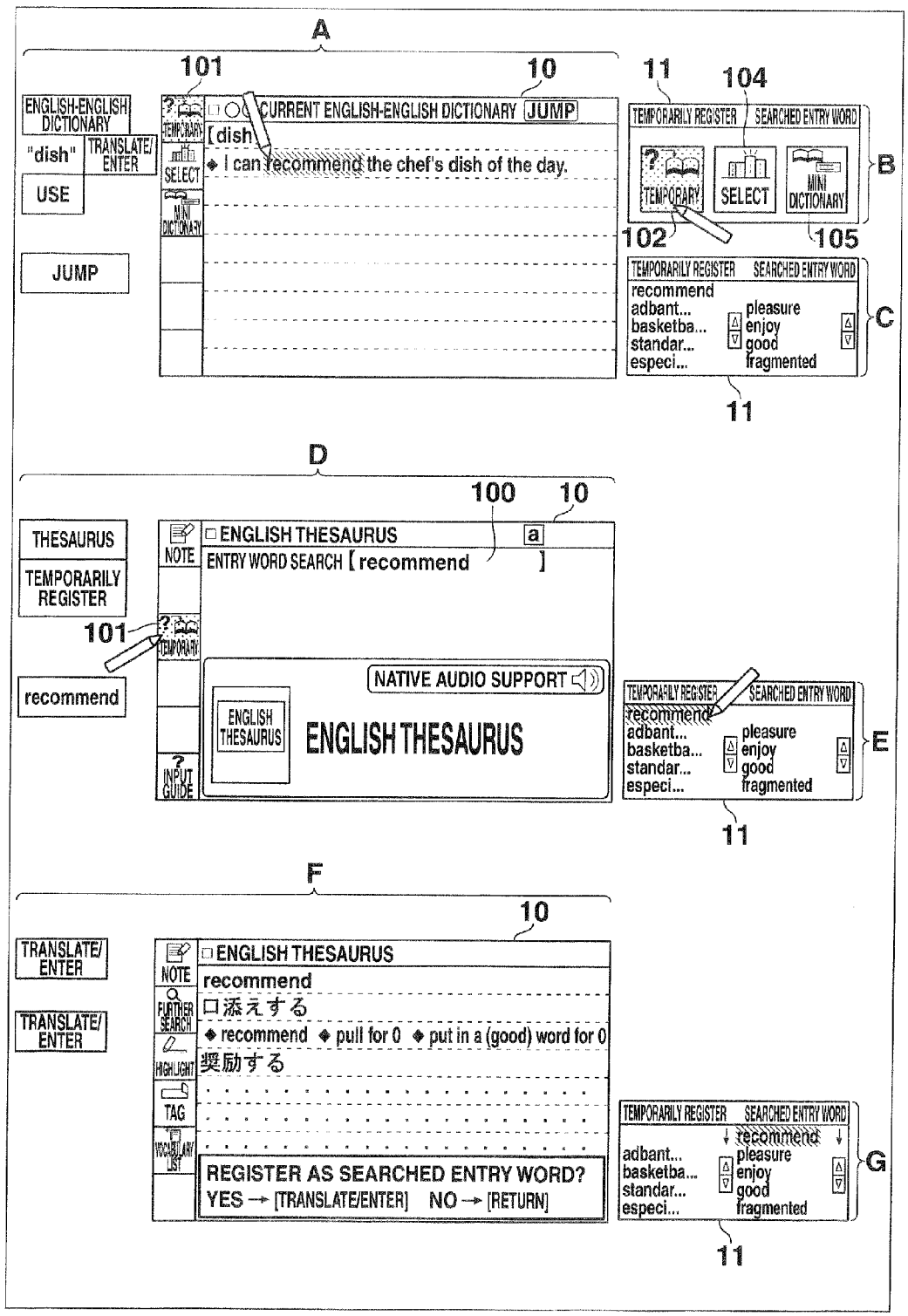
FIG. 6 is a diagram showing display content by a display section.

Next, as shown in the "C" portion of FIG. 6, the temporarily registered character string stored in the temporarily registered character string storage table 83 and the searched entry word stored in the searched entry word storage table 84 are each displayed in a list on the sub display 11 (step S63). Specifically, each temporarily registered character string is displayed according to the position order based on the position information (position information of the temporarily registered character string in the text) corresponded to each temporarily registered character string in the temporarily registered character string storage table 83. Similarly, each searched entry word is displayed according to the position order based on the "position information of the relevant temporarily stored character string" corresponded to each searched entry word in the searched entry word storage table 84.

Next, when the user performs the specifying operation on the character string "recommend" in the text (step S67; Yes), the specified character string "recommend" is additionally stored in the temporarily registered character string storage table 83 as the temporarily registered character string. Moreover, the position information (position information such as page, line, etc.) in the text of the character string and the contents name "English-English Dictionary" included in the text are stored corresponded to the temporarily registered character string "recommend" in the temporarily registered character string storage table 83 (step S68). The newly stored temporarily registered character string "recommend" is additionally displayed in the list of the temporarily registered character string on the sub display 11 according to the position order of the temporarily registered character string in the text.

Next, when the user resumes the information display processing after once ending the processing and the user performs operation to select the dictionary database 820A of the "English Thesaurus" (step S1, Step S2; Yes), as shown in the "D" portion of FIG. 6, the input screen of the search character string of the selected dictionary database 820AS (English thesaurus) is displayed on the main display 10 (step S3).

Next, when the user performs the touching operation on the temporarily registered icon 101 (step S11; Yes), as shown in the "E" portion of FIG. 6, the temporarily registered character string stored in the temporarily registered character string storage table 83 and the searched entry word stored in the searched entry word storage table 84 are each displayed in a list on the sub display 11 (step S12). Specifically, each temporarily registered character string is displayed according to the position order based on the position information (position information of the temporarily registered character string in the text) corresponded to each temporarily registered character string in the temporarily registered character string storage table 83. Similarly, each searched entry word is displayed according to the position order based on the "position information of the relevant temporarily registered character string" corresponded to each searched entry word in the searched entry word storage table 84.

Next, when the user performs the touching operation on the temporarily registered character string "recommend" on the sub display 11 (step S21; Yes), the touched temporarily registered character string "recommend" is input in the input area 100 of the main display 10 to be displayed (step S22).

Next, when the user performs the operation on the translate/enter key 2b (step S31; Yes), the entry word "recommend", etc. corresponding to the search character string "recommend" input in the input area 100 is searched in the selected dictionary database 820AS (English Thesaurus) and the retrieved entry word "recommend", etc. is displayed in a list on the main display 10 (step S32).

Next, when the user selects the entry word "recommend" displayed on the main display 10 (step S33), as shown in the "F" portion of FIG. 6, the explanatory information text of the selected entry word "recommend" is read from the selected dictionary database 820AS (English Thesaurus) and displayed on the main display 10 (step S34).

Next, in the present operation example, a message asking whether to register the selected entry word "recommend" as the searched entry word in the searched entry word storage table 84 is displayed on the main display 10 (step S78) and when the user operates the translate/enter key 2b (step S81; Yes), the selected entry word "recommend" is stored in the searched entry word storage table 84 as the searched entry word. Moreover, the following are stored corresponded to the searched entry word "recommend" in the searched entry word storage table 84, the position information of the text portion of the explanatory information text displayed presently ("position information of the text portion of the search target"), the dictionary name "English Thesaurus" of the dictionary database 820A including the text portion of the search target ("dictionary name of the dictionary database 820A of the search target"), and the position information ("position information of the relevant temporarily registered character string") and the contents name "English-English Dictionary" ("contents name of the relevant temporarily registered character string") corresponded in the temporarily registered character string storage table 83 to the temporarily registered character string "recommend" touched in step S21 (step S82). Then, as shown in the "G" portion of FIG. 6, the newly stored searched entry word "recommend" is additionally displayed in the list of the searched entry word on the sub display 11 according to the position order in the text of the temporarily registered character string based on the "position information of the relevant temporarily registered character string" corresponded to each searched entry word in the searched entry word storage table 84 (step S83).

Next, when the user resumes the information display processing after once finishing the processing and the user performs operation to select the dictionary database 820A of the "English-English Dictionary" (step S1, step S2; Yes), as shown in the "A" portion of FIG. 7, the input screen of the search character string of the selected dictionary database 820AS (English Thesaurus) is displayed on the main display 10 (step S3).

Next, when the user performs input of the search character string "fragme" (step S4, step S5; Yes), the input search character string "fragme" is displayed in the input area 100 (step S6). Here, the entry word with the prefix match to the search character string "fragme" is searched in the selected dictionary database 820AS (English Thesaurus) and the detected entry word "fragment", etc. is displayed in a list and the explanatory information of the first entry word "fragment" is displayed as a preview.

Next, when the user performs the touching operation on the temporarily registered icon 101 (step S11; Yes), as shown in the "B" portion of FIG. 7, the temporarily registered character string stored in the temporarily registered character string storage table 83 and the searched entry word stored in the searched entry word storage table 84 are each displayed in a list on the sub display 11 (step S12). Specifically, each temporarily registered character string is displayed according to the position order based on the position information (position information of the temporarily registered character string in the text) corresponded to each temporarily registered character string in the temporarily registered character string storage table 83. Similarly, each searched entry word is displayed according to the position order based on the "position information of the relevant temporarily registered character string" corresponded to each searched entry word in the searched entry word storage table 84.

Next, it is judged that the search character string "fragme" is input in the input area 100 (step S13; Yes), the search character string "fragme" is additionally stored in the temporarily registered character string storage table 83 and as shown in the "C" portion of FIG. 7, the character string is additionally displayed in the list of the temporarily registered character strings displayed on the sub display 11 (step S14).

Next, when the user resumes the information display processing after once finishing the processing and performs the operation to select the dictionary database 820A of the "Personal Computer Terminology Dictionary" (step S1, step S2; Yes), as shown in the "D" portion of FIG. 7, the input screen of the search character string of the selected dictionary database 820AS (Personal Computer Terminology Dictionary) is displayed on the main display 10 (step S3).

Next, when the user performs the touching operation on the temporarily registered icon 101 (step S11; Yes), as shown in the "E" portion of FIG. 7, the temporarily registered character string stored in the temporarily registered character string storage table 83 and the search entry word stored in the searched entry word storage table 84 are each displayed in a list on the sub display 11 (step S12). Specifically, each temporarily registered character string is displayed according to the position order based on the position information ("position information in the text of the temporarily registered character string") corresponded to each temporarily registered character string in the temporarily registered character string storage table 83. Similarly, each searched entry word is displayed according to the position order based on the "position information of the relevant temporarily registered character string" corresponded to each searched entry word in the searched entry word storage table 84.

Figure 7:
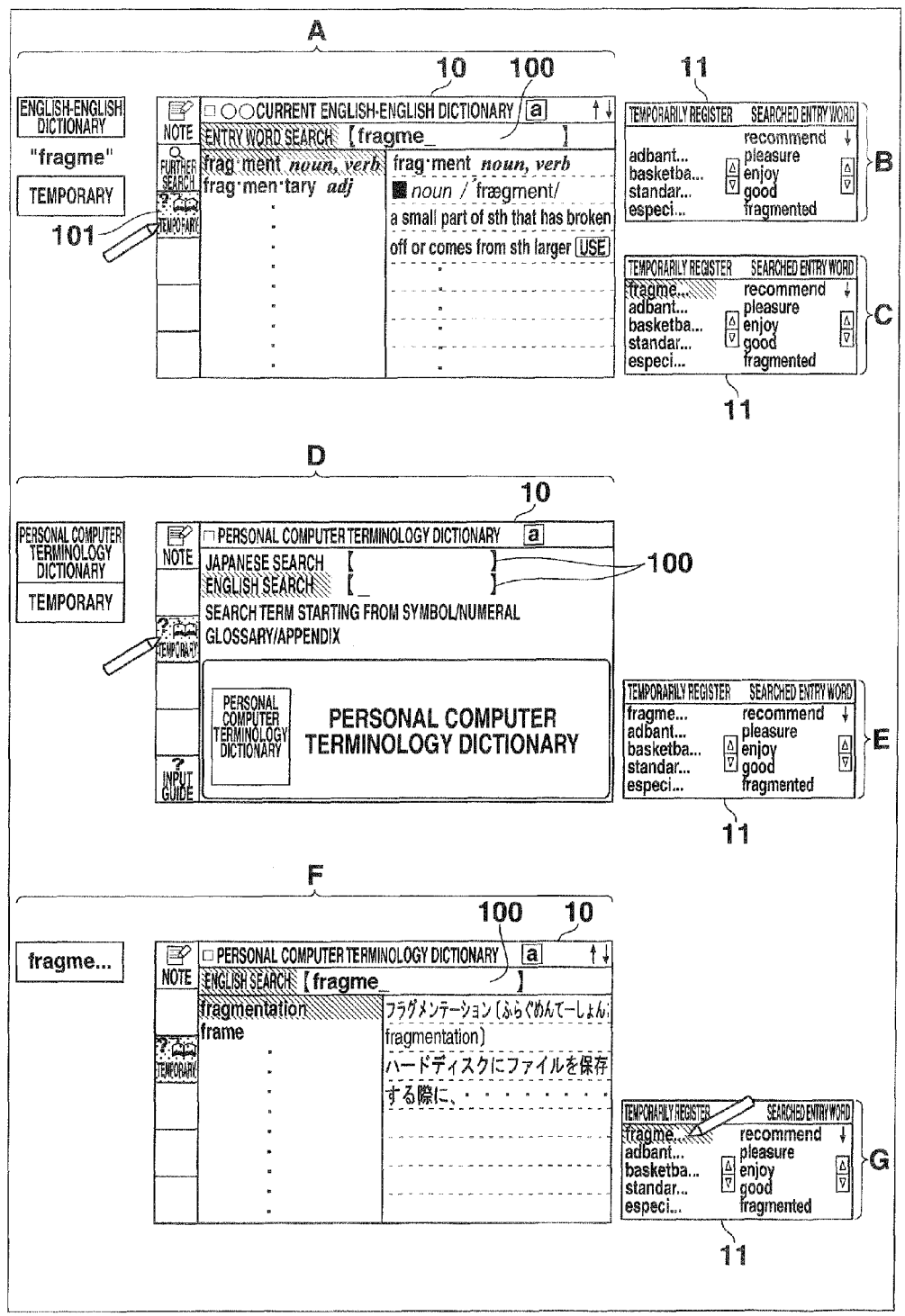
FIG. 7 is a diagram showing display content by a display section.

Next, as shown in the "F" portion and the "G" portion of FIG. 7, when the user performs touching operation on the temporarily registered character string "fragme" on the sub display 11 (step S21; Yes), the touched temporarily registered character string "fragme" is input in the input area 100 of the main display 10 to be displayed (step S22). Here, the entry word with the prefix match to the search character string "fragme" is searched in the selected dictionary database 820AS (Personal Computer Terminology Dictionary) and the retrieved entry words "fragmentation", etc. are displayed in a list and the explanatory information of the first entry word "fragmentation" is displayed as a preview. According to the present operation example, the input screen of the dictionary database 820A of the "Personal Computer Terminology Dictionary" includes two input areas 100 in Japanese and English, and after the user selects the English input area 100, the user performs the touching operation of the temporarily registered character string "fragme" on the sub display 11 to input the temporarily registered character string "fragme" in the English input area 100.

(Example of Operation (2))

First, when the user performs operation to select book content 820B of "World Literature Collection" (step S51; Yes), as shown in the portion "A" of FIG. 8, the text of the book contents 820B is displayed on the main display 10 from the position displayed last in the previous information display processing (step S52).

Next, when the user performs operation to execute jumping search (step S56; Yes), as shown in the portion "B" of FIG. 8, as the icon to select the jumping search mode, the temporary registration mode selection icon 102, the dictionary search mode selection icon 104, and the mini dictionary search mode selection icon 105 are displayed on the sub display 11 and the temporary registration mode selection icon 102 is selected to be highlighted and displayed (step S57).

Next, the temporarily registered character string stored in the temporarily registered character string storage table 83 and the searched entry word stored in the searched entry word storage table 84 are each displayed in a list on the sub display 11 (step S63). However, here the present operation example describes an example where the temporarily registered character string and the searched entry word are not stored in the temporarily registered character string storage table 83 and the searched entry word storage table 84.

Next, when the user performs the specifying operation on the character string "attributes" in the text (step S67; Yes), the specified character string "attributes" is additionally stored in the temporarily registered character string storage table 83 as the temporarily registered character string. Moreover, the position information (position information such as page, line, etc.) of the character string in the text and the contents name "World Literature Collection" including the text are stored in the temporarily registered character string storage table 83 corresponded to the temporarily registered character string "attributes" (step S68). Moreover, as shown in the portion "C" of FIG. 8, the newly stored temporarily registered character string "attributes" is displayed on the sub display 11.

Next, when the user performs changing operation of the display position of the text (step S65; Yes), as shown in the portion "D" of FIG. 8, the display position of the text is changed according to the user operation and the display content of the main display 10 is updated (step S66).

Next, when the user performs the specifying operation on the character string "emaciated" in the text (step S67; Yes), the specified character string "emaciated" is additionally stored in the temporarily registered character string storage table 83 as the temporarily registered character string. Moreover, the position information (position information such as page, line, etc.) in the text of the character string and the contents name "World Literature Collection" including the text are stored corresponded to the temporarily registered character string "emaciated" in the temporarily registered character string storage table 83 (step S68). As shown in the portion "E" of FIG. 8, the newly stored temporarily registered character string "emaciated" is additionally displayed in the list of the temporarily registered character strings on the sub display 11 according to the position order in the text of the temporarily registered character string "emaciated".

When the user performs the specifying operation on the character string "akin" in the text (step S67; Yes), the specified character string "akin" is additionally stored in the temporarily registered character string storage table 83 as the temporarily registered character string. Moreover, the position information (position information such as page, line, etc.) of the character string in the text and the contents name "World Literature Collection" including the text are stored in the temporarily registered character string storage table 83 corresponded with the temporarily registered character string "akin" (step S68). The newly stored temporarily registered character string "akin" is additionally displayed to the list of the temporarily registered character strings on the sub display 11 according to the position order in the text of the temporarily registered character string "akin".

Figure 8:
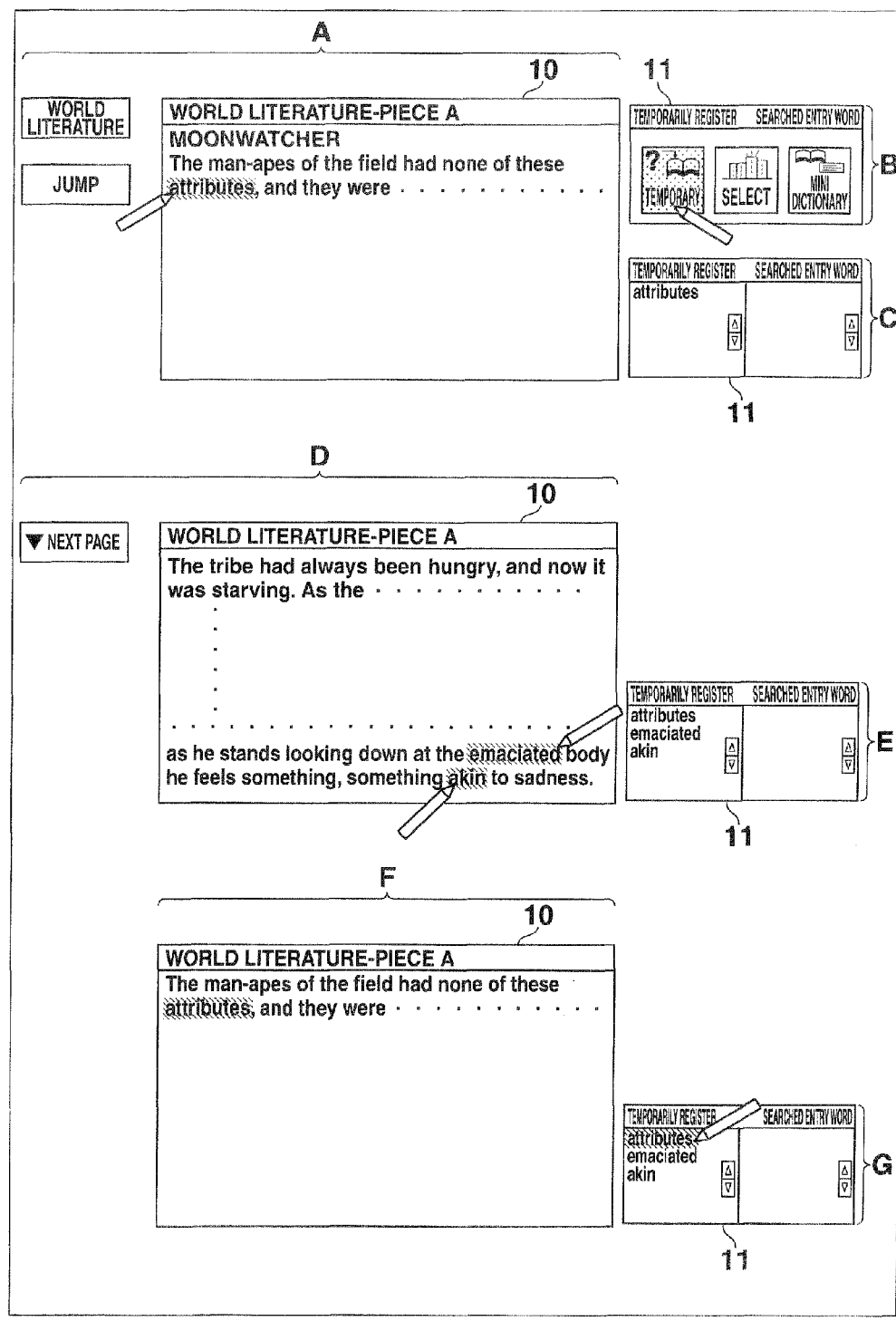
FIG. 8 is a diagram showing display content by a display section.

Next, as shown in the portion "F" and the portion "G" of FIG. 8, when the user performs the touching operation on the temporarily registered character string "attributes" on the sub display 11 (step S71; Yes), the contents name "World Literature Collection" and the position information corresponded to the touched temporarily registered character string "attributes" in the temporarily registered character string storage table 83 are referred. Among the text of the contents 820, the text portion including the temporarily registered character string "attributes" in the position shown by the position information is displayed on the main display 10 and the temporarily registered character string "attributes" is discriminated and displayed (step S72).

Figure 9:
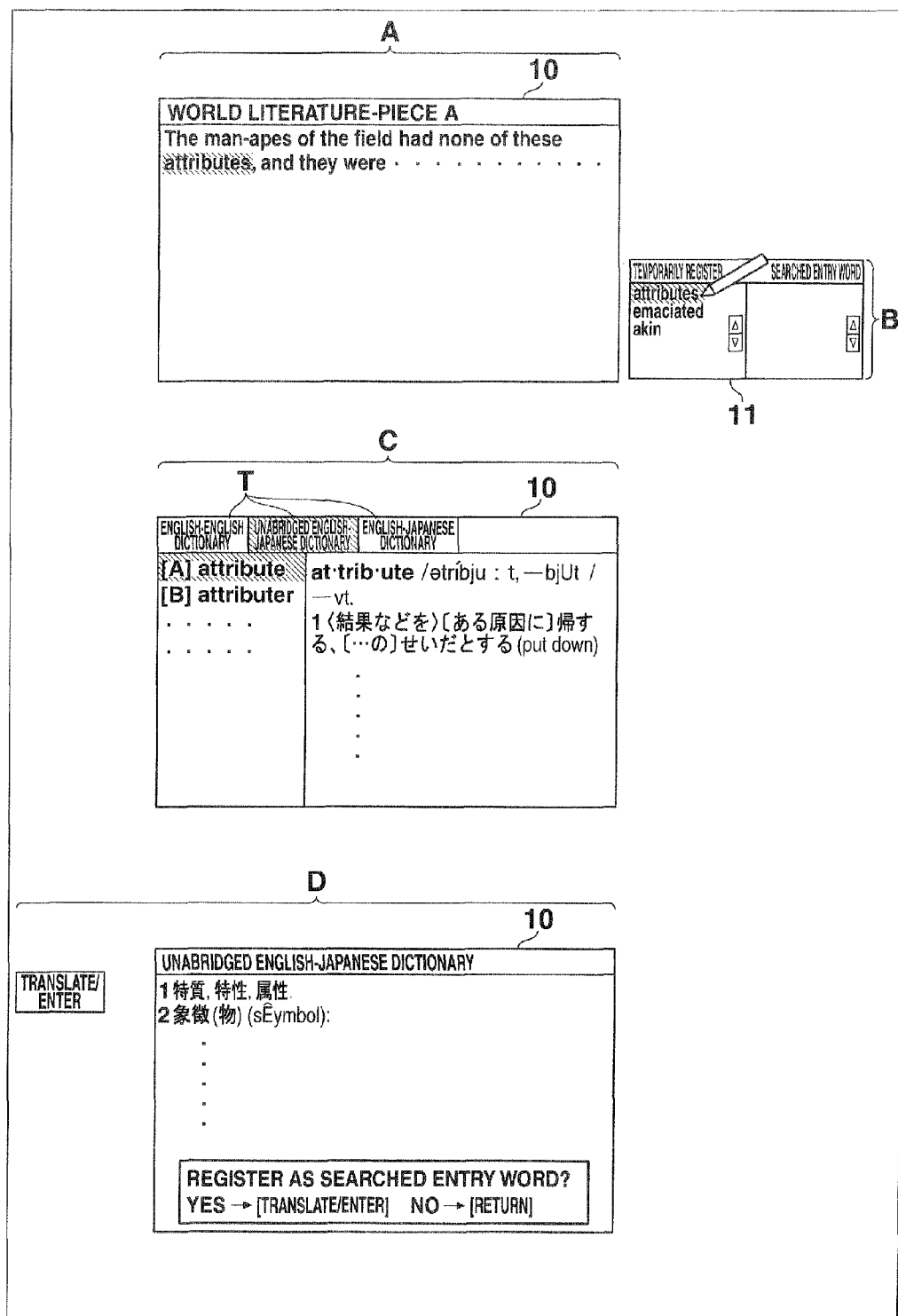
FIG. 9 is a diagram showing display content by a display section.

Next, as shown in the portion "A" and the portion "B" of FIG. 9, when the user performs the touching operation on the temporarily registered character string "attributes" again (step S73; Yes), as shown in the portion "C" of FIG. 9, the dictionary database 820A (here, the dictionary database of the "English-Japanese Dictionary") used last in the previous information display processing is to be the selected dictionary database 820AS, the entry word corresponding to the temporarily registered character string "attributes" is searched in the selected dictionary database 820AS (English-Japanese Dictionary) and the retrieved entry words "attribute", etc. are displayed in a list on the main display 10 (step S74). According to the present operation example, here the upper portion of the main display 10 displays a tab T to select the dictionary database 820A and by selecting the tab T, the selected dictionary database 820AS can be switched.

Next, when the user selects the entry word "attribute" displayed on the main display 10 (in the present operation example, the translate/enter key 2b is operated after selecting the entry word) (step S75), as shown in the portion "D" of FIG. 9, the explanatory information text of the selected entry word "attribute" is read from the selected dictionary database 820AS to be displayed on the main display 10 (step S76). Moreover, a message asking whether to register the selected entry word "attribute" as the searched entry word in the searched entry word storage table 84 is displayed on the main display 10 (step S78).

Next, when the user operates the translate/enter key 2b (step S81; Yes), the selected entry word "attribute" is stored in the searched entry word storage table 84 as the searched entry word. Moreover, the following are stored in the searched entry word storage table 84 corresponded with the searched entry word "attribute", the position information ("position information of the text portion of the search target") of the text portion presently displayed among the explanatory information text of the searched entry word, the dictionary name "Unabridged English-Japanese Dictionary" of the dictionary database 820A including the text portion of the search target ("dictionary name of the dictionary database 820A of the search target"), and the position information ("position information of the relevant temporarily registered character string") and the contents name "World Literature Collection" ("contents name of the relevant temporarily registered character string") corresponded to the temporarily registered character string "attribute" touched in step S71 in the temporarily registered character string storage table 83 (step S82). Then, as shown in the portion "A" and the portion "B" of FIG. 10, based on the "position information of the relevant temporarily registered character string" corresponded to each searched entry word in the searched entry word storage table 84, the newly stored searched entry word "attribute" is additionally displayed in the list of the searched entry words on the sub display 11 according to the position order of the temporarily registered character string in the text (step S83) and the display returns to the display content of the main display 10 (step S84).

Similarly, when the user performs the touching operation twice on each of the temporarily registered character string "emaciated" and "akin" on the sub display 11 (step S71; Yes, step S73; Yes), the entry words corresponding to the temporarily registered character strings "emaciated", "akin" are searched in the selected dictionary database 820AS (English-Japanese Dictionary) and the retrieved entry words are displayed in a list on the main display 10 (step S74). When the user selects the entry words "emaciate", "akin" displayed on the main display 10 (step S75), the explanatory information text of the selected entry words "emaciate", "akin" are read from the selected dictionary database 820AS and displayed on the main display 10 (step S76), and a message asking whether to register the selected entry word as the searched entry word in the searched entry word storage table 84 is displayed on the main display 10 (step S78). Next, when the user operates the translate/enter key 2b (step S81; Yes), the selected entry words "emaciate", "akin" are stored in the searched entry word storage table 84 as the searched entry word (step S82). Moreover, as shown in the portion "C" of FIG. 10, the newly stored searched entry words "emaciate", "akin" are additionally displayed on the list of searched entry words on the sub display 11 according to the position order of the temporarily registered character string in the text (step S83) and the display is returned to the display content of the main display 10 (step S84).

Next, when the user specifies the searched entry word "attribute" on the sub display 11 (step S91; Yes), as shown in the portion "D" of FIG. 10, based on the "position information of the relevant temporarily registered character string" and the "contents name of the relevant temporarily registered character string" (World Literature Collection) corresponded to the specified searched entry word "attribute" in the searched entry word storage table 84, among the text of the contents 820, the text portion including the temporarily registered character string "attribute" in the position shown by the position information is displayed on the main display 10 and the temporarily registered character string "attribute" is discriminated and displayed (step S92).

Figure 10:
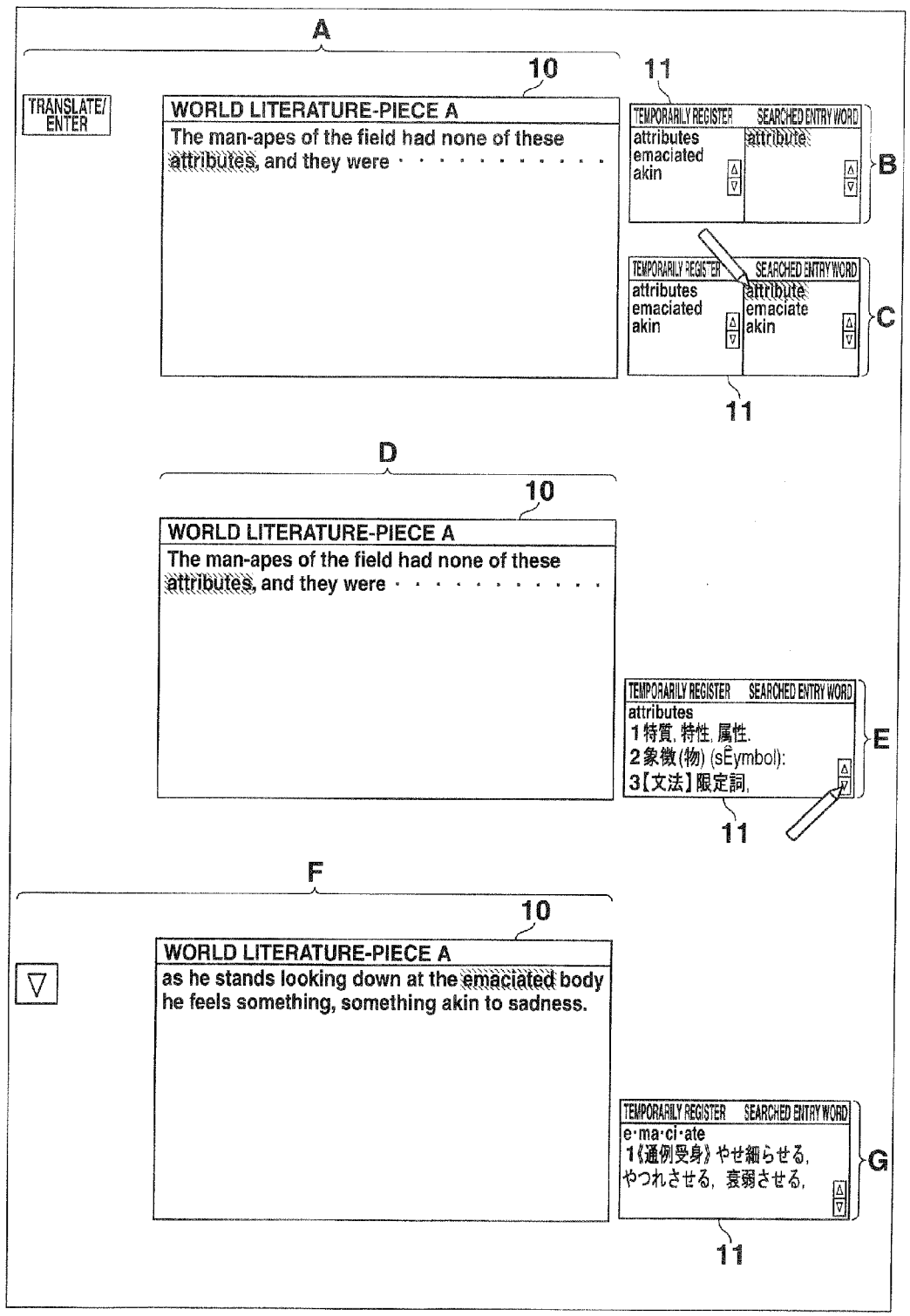
FIG. 10 is a diagram showing a display content by a display section.

Moreover, as shown in the portion "E" of FIG. 10, based on the "position information of the text portion of the search target" and the "dictionary name of the dictionary database 820A of the search target" (Unabridged English-Japanese Dictionary) corresponded to the touched searched entry word "attribute" in the searched entry word storage table 84, among the explanatory information text of the searched entry word "attribute", the text portion displayed last is displayed on the sub display 11 (step S93).

Next, when the user performs the operation to specify the next searched entry word on the sub display 11 (step S94; Yes), the searched entry word "emaciate" stored directly after the presently specified searched entry word "attribute" in the searched entry word storage table 84 is specified (step S95).

Then, as shown in the portion "F" of FIG. 10, based on the "position information of the relevant temporarily registered character string" and the "contents name of the relevant temporarily registered character string" (World Literature Collection) corresponded to the specified searched entry word "emaciate" in the searched entry word storage table 84, among the text of the contents 820, the text portion including the temporarily registered character string "emaciate" in the position shown by the position information is displayed on the main display 10 and the temporarily registered character string "emaciate" is discriminated and displayed (step S92).

Moreover, as shown in the portion "G" of FIG. 10, based on the "position information of the text portion of the search target" and the "dictionary name of the dictionary database 820A of the search destination" (Unabridged English-Japanese Dictionary) corresponded to the touched searched entry word "emaciate" in the searched entry word storage table 84, among the explanatory information text of the searched entry word "emaciate", the text portion displayed last is displayed on the sub display 11 (step S93).

According to the above electronic dictionary 1, as shown in steps S63 to S68 of FIG. 4, steps S71 to S76 of FIG. 5, FIG. 6, FIG. 8, FIG. 9, etc., the character string in the text specified by the user is stored in the temporarily registered character string storage table 83 as the temporarily registered character string and is displayed in a list. Among the character strings displayed in a list, the explanatory information of the entry word corresponding to the character string specified by the user operation is read from the dictionary database 820A and displayed. Therefore, the character string in the text which the user desires to look up can be stored as the temporarily registered character string and the meaning of the character string can be surely looked up later. Moreover, a plurality of temporarily registered character strings can be displayed in a list and the definition of each character string can be looked up. Therefore, the meaning of the character string can be efficiently looked up.

As shown in S63 of FIG. 4 and FIG. 6, FIG. 8, etc., the character string specified by the user operation in the text is stored in the temporarily registered character string storage table 83 corresponded to the position information of the character string in the text, and the stored character strings are displayed in a list according to the position order of the character string in the text. Therefore, the meaning of the character string can be looked up according to the position order in the text.

As shown in step S64 of FIG. 4, FIG. 9, FIG. 10, etc., the temporarily registered character string stored in the temporarily registered character string storage table 83 is discriminated and displayed in the text. Therefore, the use of the temporarily registered character string in the text can be easily confirmed.

As shown in step S64 of FIG. 4, steps S82, S91, S93 of FIG. 5, FIG. 10, etc., the entry word of which the explanatory information is displayed is stored in the searched entry word storage table 84 as the searched entry word and displayed in a list. Among the searched entry words displayed in a list, the explanatory information of the searched entry word specified by user operation can be read from the dictionary database 820A and displayed. Therefore, it is possible to display again the explanatory information of the entry word looked up in the past. Moreover, the explanatory information of the entry word is displayed from the portion displayed last. Therefore, it is possible to efficiently review the explanatory information.

As shown in step S63 of FIG. 4, etc., when the temporarily registered character string in the text specified by the user operation is stored in the temporarily registered character string storage table 83 and the explanatory information of the entry word corresponding to the temporarily registered character string is displayed, the entry word based on the user operation is stored in the searched entry word storage table 84 corresponded to the position information of the temporarily registered character string in the text and the entry word stored in the searched entry word storage table 84 is displayed in a list according to the position order of the position information corresponded to the entry word. Therefore, the user can review the meaning of the entry word corresponding to the temporarily registered character string according to the position order of the temporarily registered character string in the text.

As shown in step S64 of FIG. 4, etc., the character string of which the position information is stored in the searched entry word storage table 84, in other words the temporarily registered character string is discriminated and displayed in the text. Therefore, it is easy to confirm how the temporarily registered character string is used in the text.

As shown in step S14 of FIG. 3, FIG. 6, etc., the search character string input based on the user operation is stored and displayed in a list. Among the search character strings displayed in a list, the explanatory information of the entry word corresponding to the search character string specified by the user operation is read from the dictionary database 820A and displayed. Therefore, the character string which the user desires to look up is stored as the search character string and the user can surely look up the meaning of the character string later. Moreover, it is possible to display in a list a plurality of the search character strings and to look up the meaning of each character string. Therefore, it is possible to efficiently look up the meaning of the character string.

The embodiments on which the present invention can be applied is not limited to the above embodiments, and the embodiments can be suitably modified within the scope of the present invention.

Figure 1B:
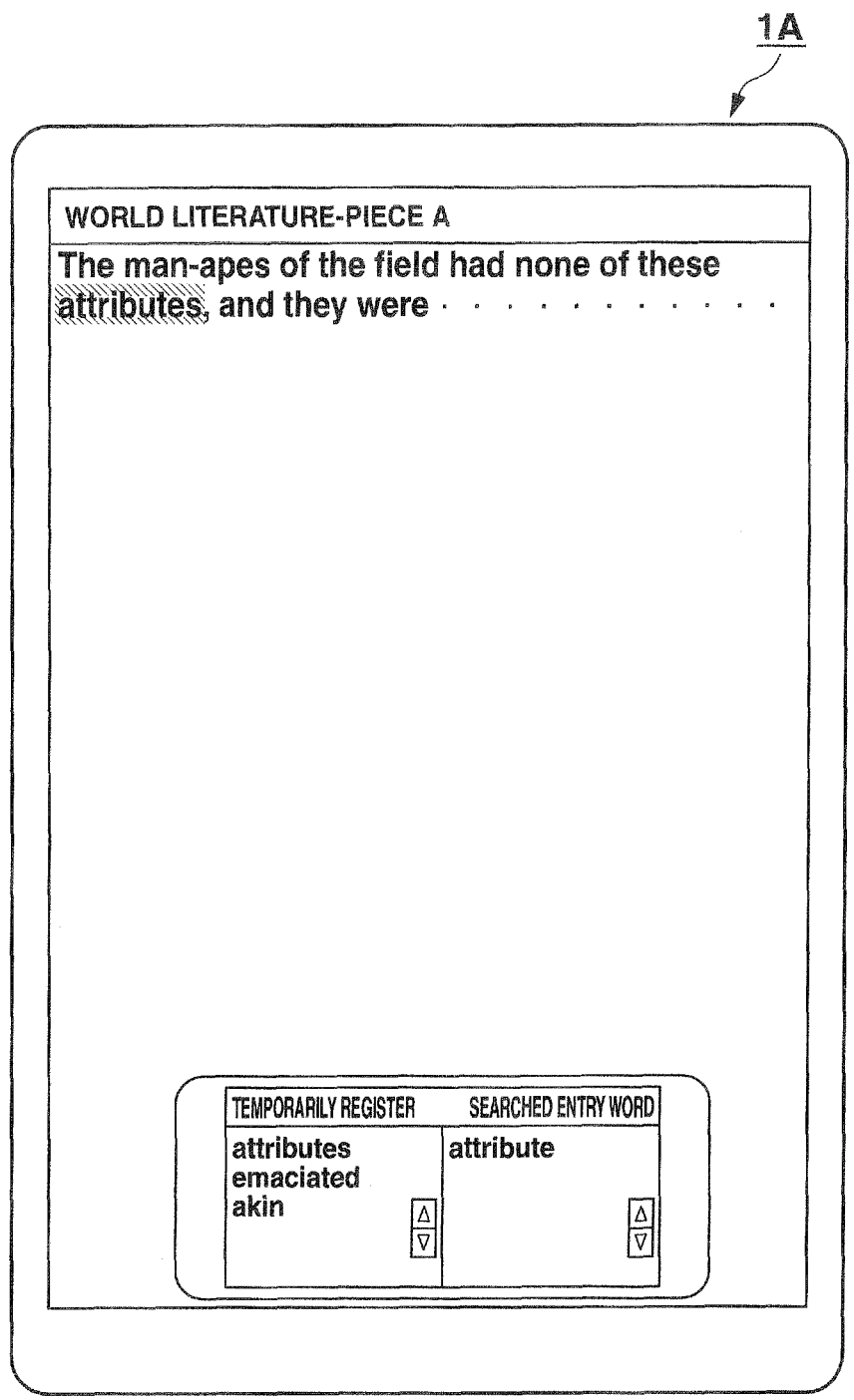
FIG. 1B is a planar view schematically showing a tablet personal computer.

For example, the information display apparatus of the present invention is described as an electronic dictionary 1. However, the apparatus on which the present invention can be applied is not limited to such product. For example, the present invention can be applied to electronic devices in general, such as portable telephones, portable computers, PDA (Personal Digital Assistant), game devices, etc. The present invention is especially preferably applied to a tablet personal computer 1A as shown in FIG. 1B.

The information display program 81 of the present invention can be stored in an external information storage medium 12a which can be attached to and removed from the electronic dictionary 1.

The present embodiment describes that the character string in the text specified by the user and the character string input by the user in the search screen of the dictionary database 820A are stored in the temporarily registered character string storage table 83. However, the above character strings can be stored in separate tables.

Although various exemplary embodiments have been shown and described, the invention is not limited to the embodiments shown. Therefore, the scope of the invention is intended to be limited solely by the scope of the claims that follow and its equivalents.

The entire disclosure of Japanese Patent Application No. 2011-285048 filed on Dec. 27, 2011 including specification, claims, drawings and abstract are incorporated herein by reference in its entirety.

What is claimed is:

1. An information display apparatus comprising:
a display; and
a processor,
wherein the processor is configured to:
display text in a content area on the display in response to a user selection operation, and display a temporarily registered character string list and a searched entry word list in another area on the display other than the content area;
temporarily register a character string which is included in the text displayed on the display in response to receiving a selection operation from the user that comprises selecting the character string in the text displayed on the display;
update the displayed temporarily registered character string list to include the temporarily registered character string selected by the user;
search an entry word corresponding to the temporarily registered character string from a dictionary in which each of a plurality of entry words is stored with corresponding explanatory information, in response to receiving a selection operation from the user that comprises selecting the temporarily registered character string in the displayed temporarily registered character string list;
display on the display a first part of the explanatory information corresponding to the searched entry word as first explanatory information in the content area;
change the display to display a second part of the explanatory information that is different from the first explanatory information in the content area, as second explanatory information, upon receiving a user operation;
register the searched entry word in correspondence with a position of the second explanatory information of the searched entry word as a last displayed position, in accordance with receiving a user operation, and update the displayed searched entry word list to include the searched entry word;
change the display from a state displaying the explanatory information in the content area to a state displaying the text in the content area, in accordance with receiving a user operation;
and
display, in the content area on the display, the explanatory information at the last displayed position of the second explanatory information of the registered searched entry word in response to receiving from the user an operation comprising selecting the registered searched entry word in the updated displayed searched entry word list.

2. The information display apparatus of claim 1, wherein the processor is further configured to:
temporarily register the character string in correspondence with position information of the character string in the text, in response to receiving the selection operation from the user comprising selecting the character string which is included in the text displayed on the display;
when a plurality of character strings selected by the user selection operation are registered temporarily, display the plurality of temporarily registered character strings in the displayed temporarily registered character string list; and
read the explanatory information of the entry word corresponding to the temporarily registered character string selected by the selection operation of the user, from among the temporarily registered character strings in the displayed temporarily registered character string list, and display, in the content area on the display, the read explanatory information.

3. The information display apparatus of claim 1, wherein the processor is further configured to:
display a text portion including the temporarily registered character string in a position in the text according to position information based on the position information of the temporarily registered character string corresponding to the selected searched entry word.

4. The information display apparatus of claim 1, wherein the processor is configured to:
discriminate and display the temporarily registered character string in a position in the text according to position information based on the position information of the temporarily registered character string corresponding to the selected searched entry word.

5. An information display method for an information display apparatus comprising a display, the method comprising:
displaying text in a content area on the display in response to a user selection operation, and displaying a temporarily registered character string list and a searched entry word list in another area on the display other than the content area;
temporarily registering a character string which is included in the text displayed on the display in response to receiving a selection operation from the user that comprises selecting the character string in the text displayed on the display;
updating the displayed temporarily registered character string list to include the temporarily registered character string selected by the user;

searching an entry word corresponding to the temporarily registered character string from a dictionary in which each of a plurality of entry words is stored with corresponding explanatory information, in response to receiving a selection operation from the user that comprises selecting the temporarily registered character string in the displayed temporarily registered character string list;

displaying on the display a first part of the explanatory information corresponding to the searched entry word as first explanatory information in the content area;

changing the display to display a second part of the explanatory information that is different from the first explanatory information in the content area, as second explanatory information, upon receiving a user operation;

registering the searched entry word in correspondence with a position of the second explanatory information of the searched entry word as a last displayed position, in accordance with receiving a user operation, and updating the displayed searched entry word list to include the searched entry word;

changing the display from a state displaying the explanatory information in the content area to a state displaying the text in the content area, in accordance with receiving a user operation; and displaying, in the content area on the display, the explanatory information at the last displayed position of the second explanatory information of the registered searched entry word in response to receiving from the user an operation comprising selecting the registered searched entry word in the updated displayed searched entry word list.

6. The information display method of claim 5, further comprising:

temporarily registering the character string in correspondence with position information of the character string in the text, in response to receiving the selection operation from the user comprising selecting the character string which is included in the text displayed on the display;

when a plurality of character strings selected by the user selection operation are registered temporarily, displaying the plurality of temporarily registered character strings in the displayed temporarily registered character string list; and reading the explanatory information of the entry word corresponding to the temporarily registered character string which is selected by the selection operation of the user, from among the temporarily registered character strings in the displayed temporarily registered character string list, and displaying, in the content area on the display, the read explanatory information.

7. The information display method of claim 5, further comprising:

displaying a text portion including the temporarily registered character string in a position in the text according to position information based on the position information of the temporarily registered character string corresponding to the selected searched entry word.

8. The information display method of claim 5, further comprising:

discriminating and displaying the temporarily registered character string in a position in the text according to position information based on the position information of the temporarily registered character string corresponding to the selected searched entry word.

9. A non-transitory computer-readable storage medium having stored thereon a program that is executable by a computer of an information display apparatus comprising at least one display, the program being executable by the computer to cause the computer to perform functions comprising:

displaying text in a content area on the display in response to a user selection operation, and displaying a temporarily registered character string list and a searched entry word list in another area on the display other than the content area;

temporarily registering a character string which is included in the text displayed on the display in response to receiving a selection operation from the user that comprises selecting the character string in the text displayed on the display;

updating the displayed temporarily registered character string list to include the temporarily registered character string selected by the user;

searching an entry word corresponding to the temporarily registered character string from a dictionary in which each of a plurality of entry words is stored with corresponding explanatory information, in response to receiving a selection operation from the user that comprises selecting the temporarily registered character string in the displayed temporarily registered character string list;

displaying on the display a first part of the explanatory information corresponding to the searched entry word as first explanatory information in the content area;

changing the display to display a second part of the explanatory information that is different from the first explanatory information in the content area, as second explanatory information, upon receiving a user operation;

registering the searched entry word in correspondence with a position of the second explanatory information of the searched entry word as a last displayed position, in accordance with receiving a user operation, and updating the displayed searched entry word list to include the searched entry word;

changing the display from a state displaying the explanatory information in the content area to a state displaying the text in the content area, in accordance with receiving a user operation; and displaying, in the content area on the display, the explanatory information at the last displayed position of the second explanatory information of the registered searched entry word in response to receiving from the user an operation comprising selecting the registered searched entry word in the updated displayed searched entry word list.

10. The non-transitory computer-readable storage medium of claim 9, wherein the program further causes the computer to perform functions comprising:

temporarily registering the character string in correspondence with position information of the character string in the text, in response to receiving the selection operation from the user comprising selecting the character string which is included in the text displayed on the display;

when a plurality of character strings selected by the user selection operation are registered temporarily, displaying the plurality of temporarily registered character strings in the displayed temporarily registered character string list; and reading the explanatory information of the entry word corresponding to the temporarily registered character string which selected by the selection operation of the user, from among the temporarily registered character strings in the displayed temporarily registered character string list, and displaying, in the content area on the display, the read explanatory information.

11. The non-transitory computer-readable storage medium of claim 9, wherein the program further causes the computer to perform functions comprising:

displaying a text portion including the temporarily registered character string in a position in the text according to position information based on the position information of the temporarily registered character string corresponding to the selected searched entry word.

12. The non-transitory computer-readable storage medium of claim 9, wherein the program further causes the computer to perform functions comprising:

discriminating and displaying the temporarily registered character string in a position in the text according to position information based on the position information of the temporarily registered character string corresponding to the selected searched entry word.

* * * * *